(12) United States Patent
Beaujean

(10) Patent No.: US 6,461,079 B1
(45) Date of Patent: Oct. 8, 2002

(54) SYSTEM FOR CONTROLLED LOWERING OF A TUBE OR CABLE

(75) Inventor: Joseph Marie Elise Beaujean, Venlo (NL)

(73) Assignee: Bogey Venlo B.V., Venlo (NL)

( * ) Notice: Subject to any disclaimer, the term of this patent is extended or adjusted under 35 U.S.C. 154(b) by 0 days.

(21) Appl. No.: 09/763,197

(22) PCT Filed: Aug. 17, 1999

(86) PCT No.: PCT/NL99/00520

§ 371 (c)(1),
(2), (4) Date: Apr. 25, 2001

(87) PCT Pub. No.: WO00/11387

PCT Pub. Date: Mar. 2, 2000

(30) Foreign Application Priority Data

Aug. 20, 1998 (EP) ............................................. 98202805

(51) Int. Cl.⁷ ............................ F16L 1/18; F16L 11/133
(52) U.S. Cl. ..................... 405/171; 405/167; 405/184.4
(58) Field of Search ................................ 405/158, 166, 405/167, 169, 170, 171, 184.4; 138/93; 29/429

(56) References Cited

U.S. PATENT DOCUMENTS

| | | | |
|---|---|---|---|
| 3,583,169 A | 6/1971 | Morgan | 405/171 |
| 3,977,201 A * | 8/1976 | Bittner | 29/429 |
| 3,992,735 A * | 11/1976 | McCarthy | 405/171 |
| 4,127,006 A | 11/1978 | Oosterkamp | 405/171 |
| 5,575,590 A | 11/1996 | Drost et al. | 405/166 |
| 5,797,702 A * | 8/1998 | Drost et al. | 405/166 |

FOREIGN PATENT DOCUMENTS

GB 947196 * 1/1964

* cited by examiner

Primary Examiner—Thomas B. Will
Assistant Examiner—Tara L. Mayo
(74) Attorney, Agent, or Firm—Young & Thompson

(57) ABSTRACT

A system for controlled lowering of an elongated body such as a tube or cable, from a relatively high level, especially the water level to a relatively low level, especially the (sea) bottom. The system includes an elongated tubular guide that is connected to one or more buoyancy bodies. The system also includes a braking device for braking the movement of the elongated body through the tubular guide. The braking device includes a number of braking units incorporated in the tubular guide and distributed over the length thereof. The braking units are under control of a central control unit which controls the braking force applied by each braking unit.

10 Claims, 3 Drawing Sheets

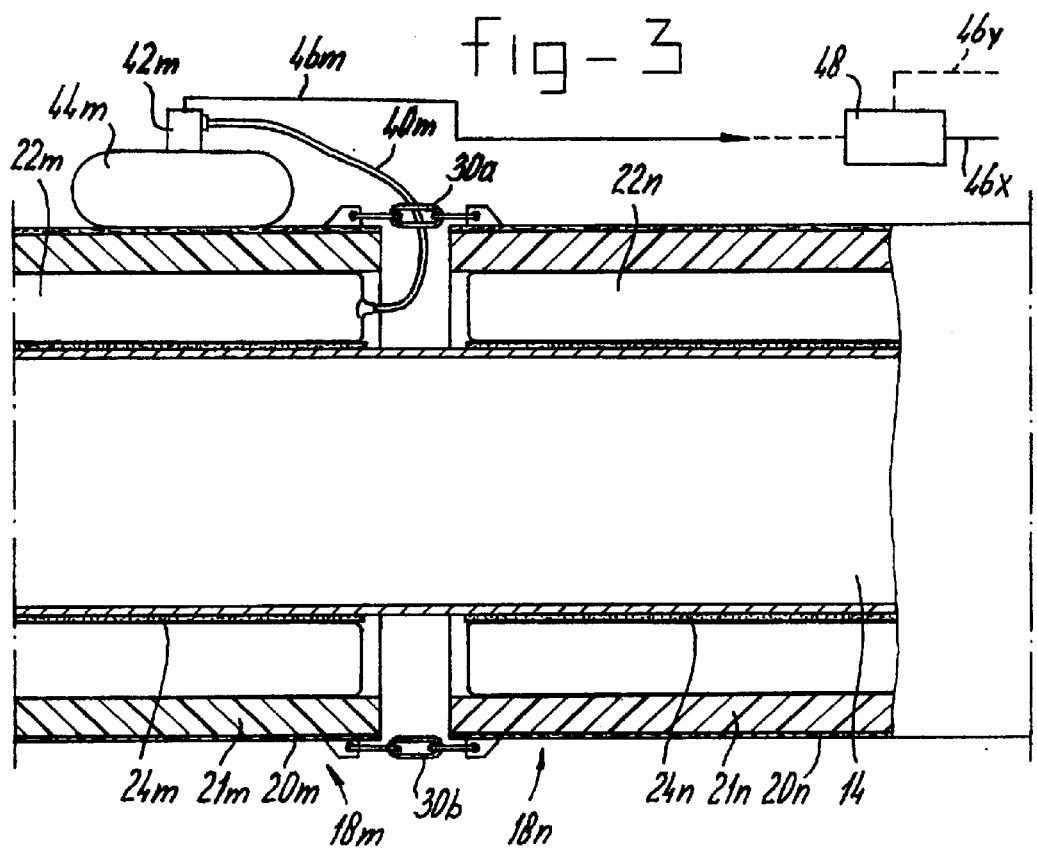
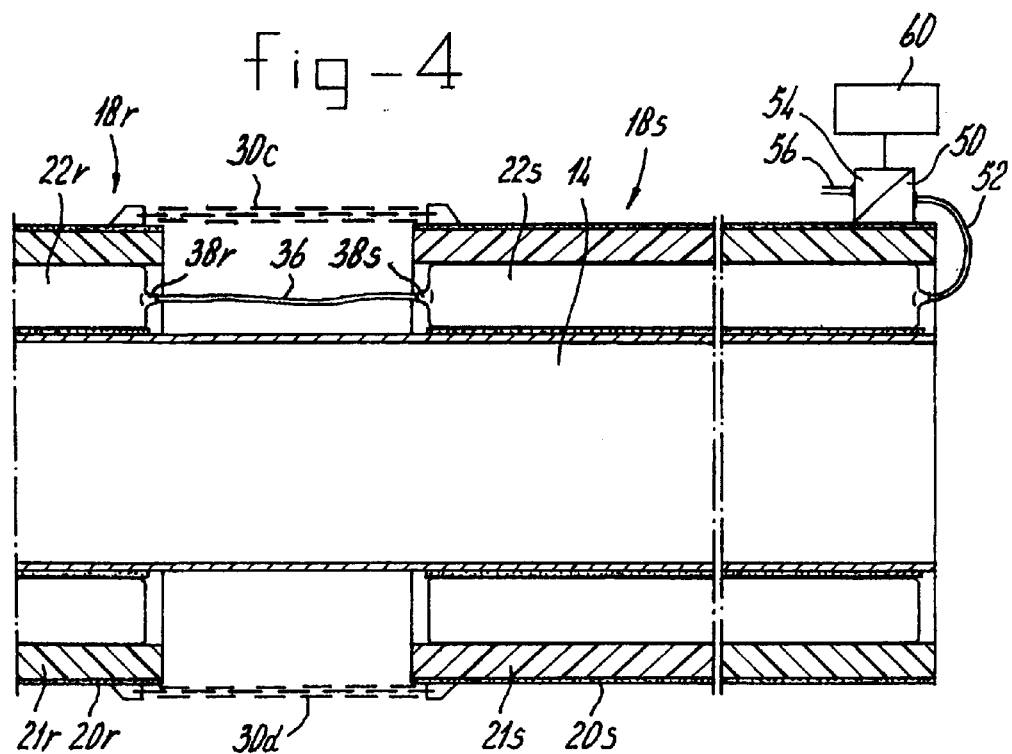

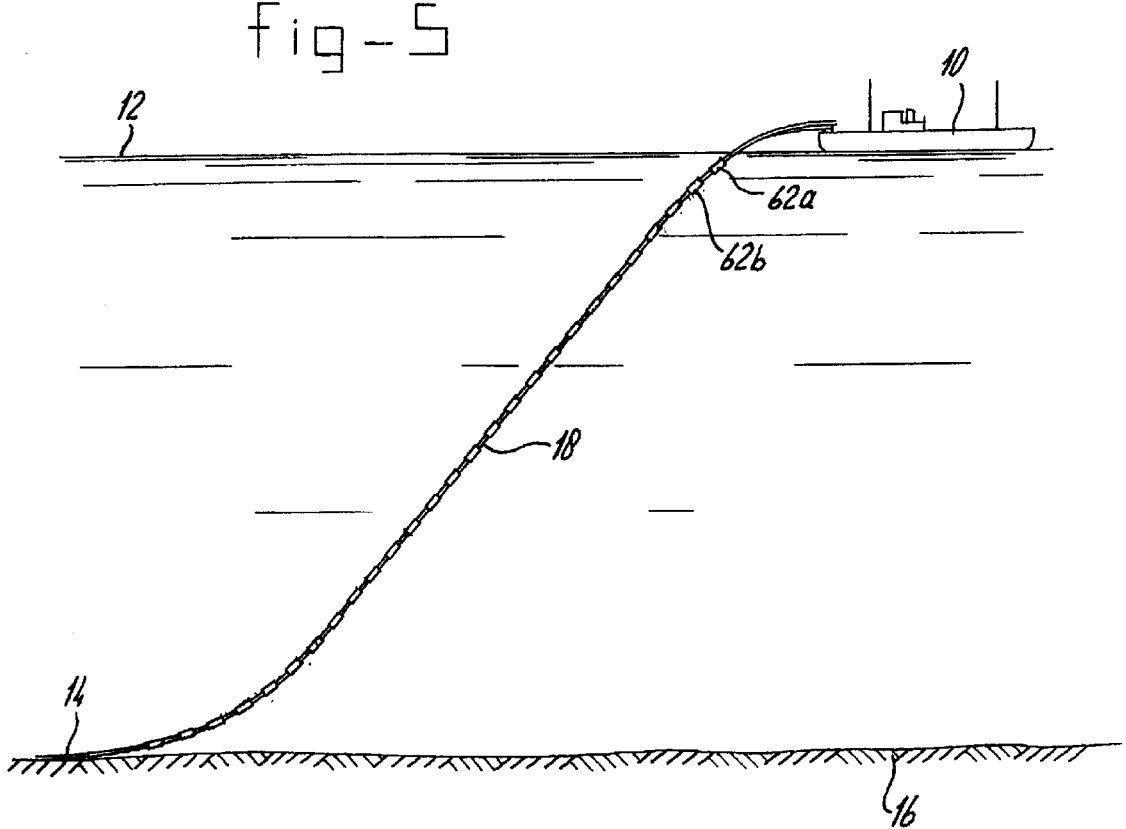
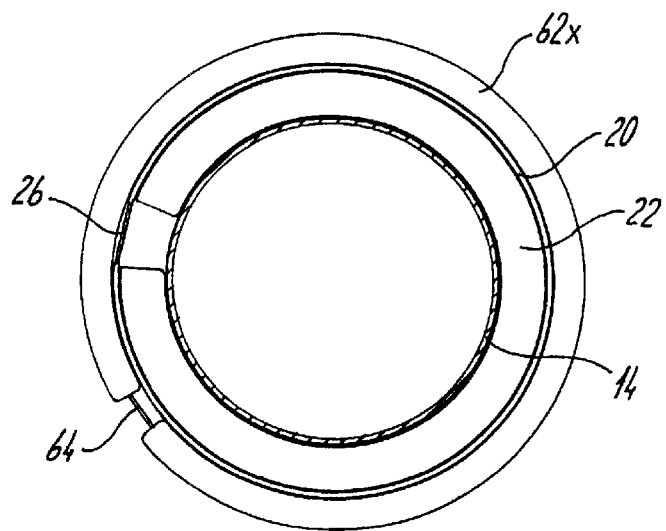

SYSTEM FOR CONTROLLED LOWERING OF A TUBE OR CABLE

BACKGROUND OF THE INVENTION

The invention relates to a system for controlled lowering of an elongated body such as a tube or cable into a volume of water such as a lake or sea, from a relatively high level, especially the water level of said volume of water, to a relatively low level, especially the bottom under said volume of water, comprising an elongated tubular guide which is connected to one or more buoyancy bodies, and braking means for braking the movement of said elongated body through said tubular guide, said braking means incorporating at least one braking unit comprising:

- a flexible tubular inflatable body, the outer wall being supported by said tubular guide and the inner wall of which acts as braking surface,
- a valve unit for inflating or deflating the inflatable body whereby the valve unit is connected to a source of pressurized fluid and is controlled by a control unit.

Such a system is known from the US specification U.S. Pat. No. 5,575,590. In this document air is used to inflate or deflated the inflatable bodies of the braking units. Each braking unit is connected to an individual source of pressured air and the pressure inside the inflatable body of each of the braking units is preset independent of the other braking units on a value which is dependent on the depth at which the respective braking unit thereafter has to function. Because of the increasing hydrostatic pressure the air or gas in the inflatable body is compressed more and more with increasing depth. As a result the contact surface between the inflatable body and the tube becomes smaller and smaller so that in fact in each braking unit only a part of the initial braking surface will be active. Controlling the actual braking force under these circumstances in the prior art system is rather difficult or even impossible.

SUMMARY OF THE INVENTION

The object of the invention is now to eliminate the above indicated disadvantage.

In agreement with said object the invention now provides a system of the above indicated type which according to the invention is characterized in that the fluid inside each inflatable body has a specific weight equal to or at least nearly to the specific weight of the surrounding water.

It is especially preferred that the fluid inside each inflatable body consists of the same water as the surrounding water.

In one further development each valve unit is connected to a separate fluid reservoir attached to the corresponding braking unit and acting as source of pressurized fluid for said valve unit. Each braking unit is now able to operate independent of the others. The large number of reservoirs could be a disadvantage of this embodiment.

In another development a number of valve units (preferably all valve units) are connected to a fluid conduit which extends along the tubular guide and is connected to one fluid reservoir acting as source of pressurized fluid for said valve units. Only one reservoir is needed in this embodiment, however, a fluid conduit is necessary between each valve unit and the common reservoir.

The control communication between the control center and the valve units can be performed in various ways using data transfer along electrical connections, along acoustical communication paths, using radio waves, etc.

In all known prior ad cases pressurised air is used as fluid for inflating or deflating the inflatable bodies of the braking units and for determining in correspondence therewith the applied braking force. Assume a water depth of 2000 m and assume a desired control range of 50 cm water column. In that case 4000 braking units would be necessary each capable of functioning at a different depth and at a different hydrostatic bias pressure.

With increasing water depth the controllability of the valve units becomes more and more a problem. The valve unit which has to operate for instance at 1000 m depth should have a pressure control range between 999.75 m and 1000.25 m water column. Such a control range poses a serious problem. This problem will be twice as serious for the most lower valve unit which has to operate in the pressure range between 1999.75 m and 2000.25 m water column. An accurate control within such a small control range under such relatively high bias pressure of the surrounding sea water is hardly performable.

The whole problem is caused by the depth dependent hydrostatic pressure. The question how to eliminate this problem appeared to be surprisingly simple. The hydrostatic pressure acting on the outside of the inflatable bodies baa to be eliminated by the pressurizing control fluid inside the inflatable bodies. To obtain such a situation a preferred embodiment of the system is characterised in that the fluid has a specific weight equal to the specific weight of (sea) water. It is especially preferred that the fluid is (sea)water.

By using (sea)water as fluid the hydrostatic pressure difference is completely eliminated at all depths.

In a preferred system, in which the abovementioned fluid is (sea)water, the number of braking units is equal to one, said one braking unit comprising:

- an elongated non stretchable outer tubular wall
- an elongated flexible tubular inflatable body, the outer wall of which is supported by said outer tubular wall and the inner wall of which acts as braking surface,
- a valve unit connected to a pump unit through which (sea)water can be pumped in or out the inflatable body to obtain the required braking stress.

The abovementioned elongated outer wall and the elongated flexible tubular inflatable body preferably extends from just below sea level to just above bottom level. In that case the whole tube is guided and controlled by only one combined component.

If for reasons which will not be discussed here it is preferred to use two or more braking units then each of the braking units comprises

- a non stretchable outer tubular wall
- a flexible tubular inflatable body, the outer wall of which is supported by said outer tubular wall and the inner wail of which acts as braking surface,
- whereby all outer tubular walls are mechanically connected in series,
- whereby all flexible tubular inflatable bodies and a valve unit are connected in series by suitable conduits, and
- whereby furthermore the valve unit is connected to a pump unit through which (sea)water can be pumped in or out the series connected inflatable bodies to obtain the required braking stress.

The pump can be of a rather simple design which only has to be able to generate a pressure in the desired control pressure range, in the above example a pressure between 0 and 50 cm water column.

BRIEF DESCRIPTION OF THE DRAWINGS

The invention will be explained further with reference to the attached drawings.

FIG. 3 illustrates a longitudinal section through a first embodiment of a system according to the invention especially at the interconnection between two sections of the elongated tubular guide.

FIG. 4 illustrates a longitudinal section through a second embodiment of a system according to the invention especially at the interconnection between two sections of the elongated tubular guide and one end of the tubular guide.

FIG. 5 shows an embodiment with only one elongated brake unit and separate outside buoyancy bodies.

FIG. 6 illustrates a cross section through the elongated brake unit of FIG. 5.

DETAILED DESCRIPTION OF THE PREFERRED EMBODIMENTS

Figure 1:
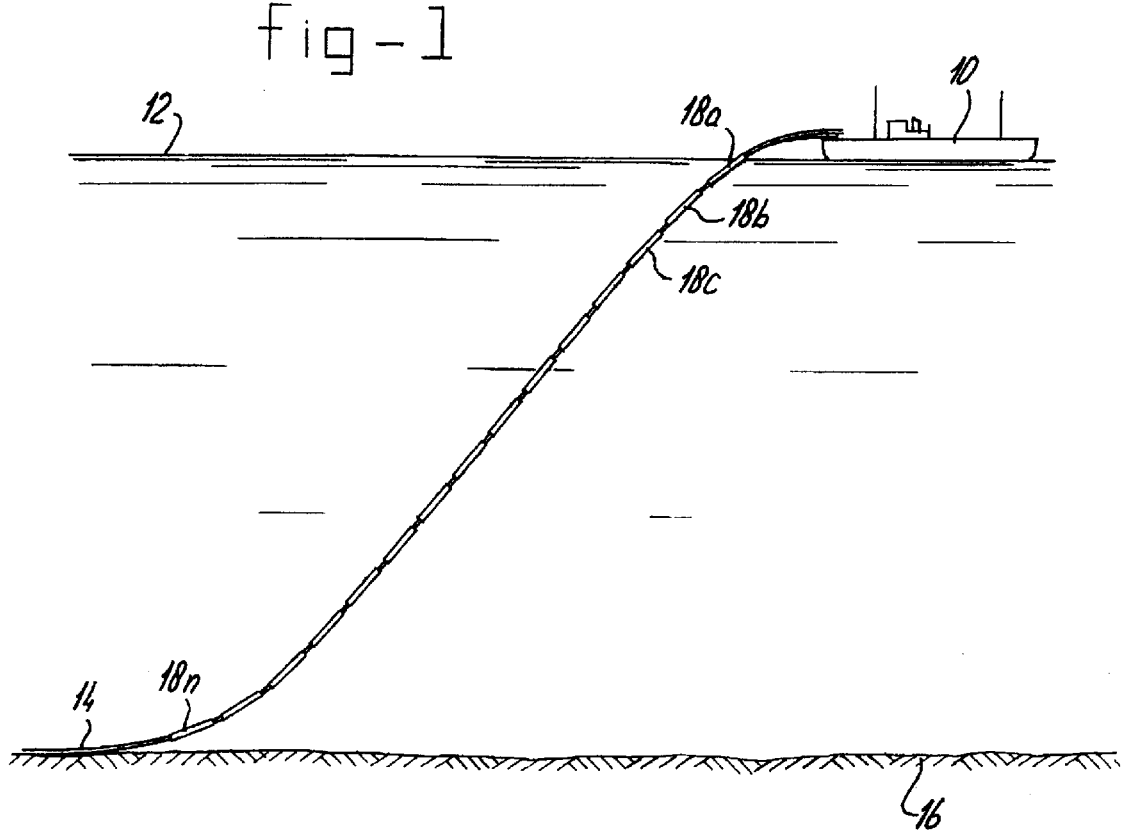
FIG. 1 illustrates schematically the general situation during lowering of a tube or cable from a ship onto the sea bottom.

FIG. 1 illustrates a vessel 10, floating on the sea surface 12, from which vessel 11 an elongated object such as a tube or cable 14 is lowered onto the sea bottom 16. To limit the velocity with which the tube or cable 14 is lowered and to maintain during the whole process an S-shape in the cable or tube 14 so that kinking or buckling of the cable or tube 14 is prevented, an elongated tubular guide is used which in the illustrated embodiment comprises a number of sections 18a, 18b, 18c, . . . , 18n. Each of those sections 18a etc. has a predetermined buoyant capacity necessary to maintain the abovementioned S-shape. Furthermore, each section comprises brake means which are clamped around the tubular cable 14 such that a braking force is applied to the tube or cable which is at least to a large degree in balance with the buoyant force.

Figure 2:
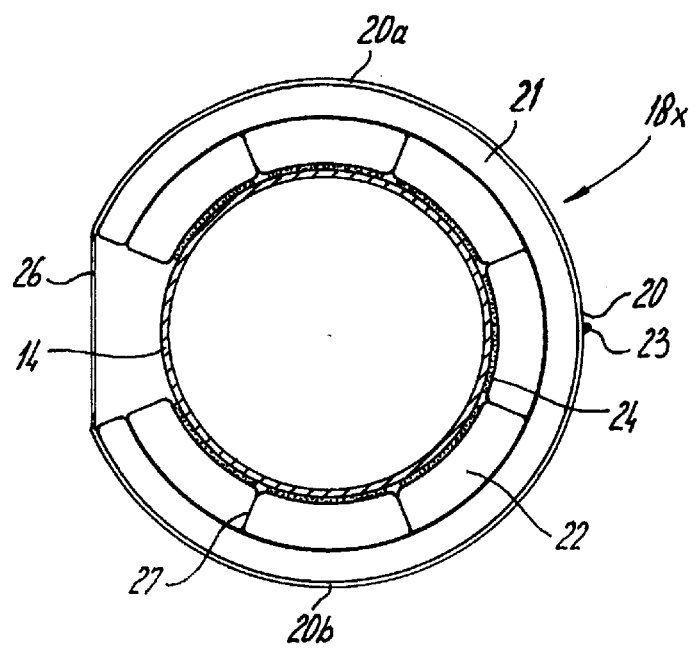
FIG. 2 illustrates a cross-section through a system according to the invention.

FIG. 2 illustrates a cross-section through one of the sections 18x, clamped around a tube 14. The section 18x comprises a non stretchable outer tubular wall 20. Within said tubular wall a layer 21 is situated made from a material with a lower specific gravity than water, which material generates the abovementioned buoyancy force. As such suitable materials are known and furthermore the buoyancy features are not the subject of the invention, therefore a further detailed discussion is considered superfluous.

Within the layer 21, the braking unit is positioned and which comprises a flexible tubular inflatable body 22. At the inside surface this body may comprise a coating of friction material 24. However, taking into account the relatively large contact surface between the body 22 and the tube 14 in many cases this friction layer could be omitted.

To improve handling of the whole system it is preferred that the tubular configuration can be made from an initially flat or at least open configuration by folding the flat configuration around the tube 14 and fastening the longitudinal edges to each other. If the outer wall 20 is made of a rather stiff material such as metal then it is preferred that the outer wall 20 is divided into a number of segments interconnected by means of hinges. In the illustrated embodiment in FIG. 2 there are two of such segments 20a and 20b interconnected by the hinge 23. On the other hand one could make outer wall from any strong flexible but non stretchable material in which case the jacket could be attached as a blanket around the tube 14. The longitudinal edges of the outer wall are connected by means or a number of cables or chains 26 which preferably are as short as possible. Because of the presence of these cables or chains the flexible inflatable body 22 does not completely surround the cable or tube 14 but fills only the volume between the outer wall 20 and the cable or tube 14, which volume has to be (nearly) constant.

To improve the strength of the configuration and to improve the transfer of the braking forces from the braking layer 24 to the buoyancy layer 21 the braking cushion 22 might be internally subdivided by means of dividing walls one of which is indicated by 27 in FIG. 2. It will be clear that the resulting subvolumes of the cushion 22 are all interconnected so that the pressure inside each subvolume is always the same.

FIG. 3 illustrates a longitudinal cross-section through a specific embodiment of the elongated tubular guide comprising at least the segments 18M and 18N. Each of the segments 18M, 18N, has an outer layer 20M, 20N, . . . , a buoyancy layer 21M, 21N, . . . , and a braking cushion 22M, 22N, . . . , of which the inner side could have a strengthening layer 24M, 24N, . . . , of e.g. friction material. The various segments are interconnected by suitable means such as the chains 30A, 30B. In this embodiment the braking cushion 22M of segment 18M of the tubular guide is through a suitable conduit 40M and a valve unit 42M connected to a reservoir 44M. The reservoir 44M comprises for instance pressurized air which through the valve unit 42 can be filled into the inflatable body 22M. On the other hand the valve means 42M are able to let pressurized air escape from the body 22M through the conduit 40M into the surroundings. All other segments of the tubular guide are in the same manner equipped with valve means and reservoirs.

By controlling the inflating/deflating of the body 22M a predetermined pressure can be set as soon as the segment 18x has reached its operating depth. An electrical control line 46M extends from the valve means 42M to a central control unit 48. All other valve means from all other segments are in the same manner connected to this central control unit 48 as indicated by the dotted lines 46X and 46Y. Preferably, the central control unit set and maintain the pressure in each of the inflatable bodies in each of the braking means at the desired value.

Instead of a pressurized fluid reservoir 44 for each of the segments of the elongated tubular guide, it will be clear even without detailed illustration that one (larger) reservoir can be installed somewhere along the tubular guide 18. In that case each segment of the tubular guide comprises only a act of valve means, which on the one hand are connected to the inflatable body of the respective segment and are on the other hand through suitable conduit means connected to said central reservoir. The valve means are in the same manner as in FIG. 3 connected to a central controller 48 for controlling the pressure inside various inflatable bodies.

As already indicated above, it is preferred to fill the inflatable bodies with a substance which has the same specific gravity as the surrounding (sea) water and more especially to fill the bodies actually with (sea)water. By filling these bodies with (sea)water, the problems with the hydrostatic pressure are eliminated. The hydrostatic pressure outside and inside the inflatable bodies 22 is equal. A rather small overpressure is already sufficient to generate a rather large braking force by each of the inflatable hollow bodies 22.

An example of an embodiment whereby sea water is used as the fluid for inflating/deflating the hollow bodies is illustrated in FIG. 4. This figure shows parts of the segments 18R and 18S of the elongated body. Each of the segments 18S, 18R, . . . , has an outer layer 20S, 20R, . . . , a buoyancy layer 21S, 21R, . . . , and a braking cushion 22R, 22SN, . . . . The various segments are mechanically interconnected by suitable means such as the chains 30C, 30D. Although relatively long chains are shown the relatively short chains as indicated in FIG. 3 are preferred.

The actual difference between FIGS. 3 and 4 relies in the fact that in FIG. 4 all the inflatable bodies are connected in series by means of suitable conduits. One of these conduits 36 is visible at the left hand side of FIG. 4. This conduit 36 is connected between the inflatable bodies 22R and 22S through suitable connectors 38R and 38S. The whole system comprises only one valve means 50 which through a suitable conduit 52 is connected to one of the inflatable bodies 18 . . . in the series, in the illustrated case the last inflatable body 18S of the series. The valve means 50 cooperates with a pump 54 such that either (sea) water from the surroundings is pumped from the port 56 through the valve means 50 and the conduit 52 into the series circuit of inflatable bodies 22, or water is through the conduit 52, the valve means 50 and the port 56 pumped out of the series circuit of inflatable bodies. The inflating/deflating operation is under control of a central controller 60 which preferably is installed on board of the vessel 10.

In the embodiment of FIG. 4 only one valve in combination with only one pump is necessary to control the braking force developed by the combination of all braking means. Controlling this configuration by means of the controller is rather simple.

Instead of two or more braking units a preferred embodiment of the system, comprises only one elongated braking unit 18 as schematically illustrated in FIG. 5. FIG. 5 shows a view similar to the view in FIG. 1. As illustrated in cross section in FIG. 6 the elongated body 18 now comprises only one combination of an outer layer 20, and a braking cushion 22. The pump/valve combination for inflating/deflating the braking cushion is installed on board the ship 10 and not shown separately in FIG. 5.

In this embodiment the buoyancy capacity is supplied by a series of annular buoyancy bodies 62a, 62b, . . . , which are attached with mutual intervals around the elongated braking unit. The buoyancy bodies may have some flexibility so that they can be clipped around the unit 18 and secured by means of a suitable fastener 64 rather easily.

What is claimed is:

1. A system for controlled lowering of an elongated body into a volume of water, from a relatively high level, to a relatively low level, comprising an elongated tubular guide which is connected to one or more buoyancy bodies, and braking means for braking the movement of said elongated body through said tubular guide, said braking means incorporating at least one braking unit comprising:

a flexible annular inflatable body having an outwardly directed wall supported by said tubular guide and an inwardly directed wall that acts as a braking surface, and a valve unit for inflating or deflating the inflatable body, whereby the valve unit is connected to a source of pressurized fluid and is controlled by a control unit, wherein, the fluid inside each inflatable body has a specific weight substantially equal to the specific weight of the volume of water.

2. The system according to claim 1, wherein the fluid inside each inflatable body consists of the same water as the surrounding water.

3. The system according to claim 1, wherein each valve unit is connected to a separate fluid reservoir attached to the corresponding braking unit and acting as a source of pressurized fluid for said valve unit.

4. The system according to claim 1, wherein a plurality of valve units are connected to a fluid conduit which extends along the tubular guide and is connected to one fluid reservoir acting as a source of pressurized fluid for said valve units.

5. The system according to claim 1, wherein a number of braking units is equal to one, said one braking unit comprising:

an elongated non stretchable outer tubular wall;

an elongated flexible tubular inflatable body, the outer wall of which is supported by said outer tubular wall and the inner wall of which acts as a braking surface, and a valve unit connected to a pump unit through which water can be pumped in or out the inflatable body to obtain a required braking force.

6. The system according to claim 1, wherein a number of braking units is two or more and each of the braking units comprises:

a non-stretchable rigid outer tubular wall;

a flexible tubular inflatable body, the outer wall of which is supported by said rigid outer tubular wall and the inner wall of which acts as a braking surface, wherein each outer wall is mechanically connected in series, wherein each flexible tubular inflatable body and a valve unit are connected in series by suitable conduits, and wherein the valve unit is connected to a pump unit through which water can be pumped into or out of the series of connected inflatable bodies to obtain a required braking force.

7. The system according to claim 1, wherein the tubular guide is made out of interconnected sections each comprising one of the braking units.

8. The system according to claim 1, wherein the volume of water is one of a lake and a sea.

9. The system according to claim 8, wherein the relatively low is a bottom of one of the lake and the sea.

10. The system according to claim 1, wherein the relatively high level is the water level of said volume of water.

* * * * *